Jan. 22, 1957   R. W. CHALMERS   2,778,591
WIRE PALLET
Filed Jan. 21, 1953   2 Sheets-Sheet 1
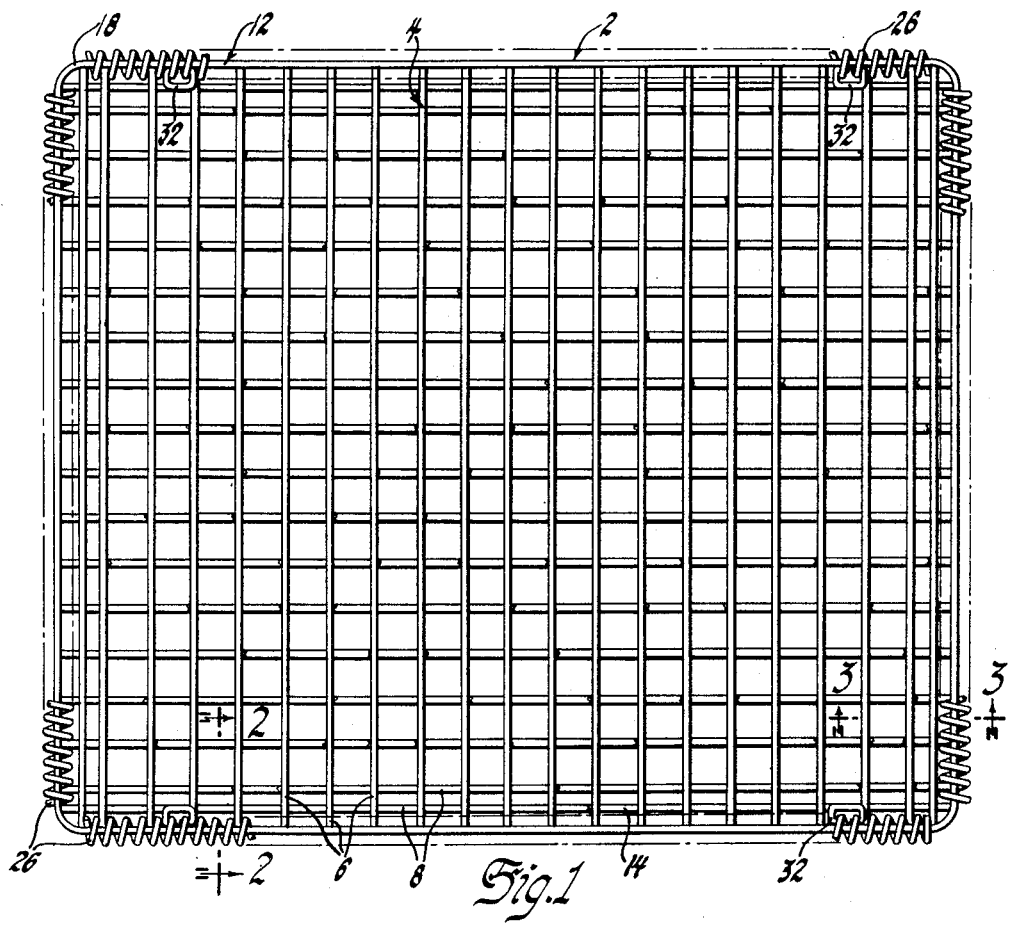
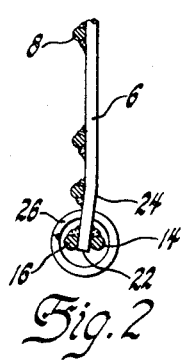
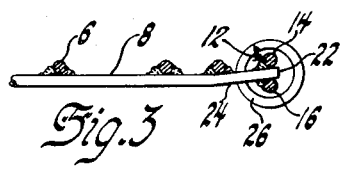
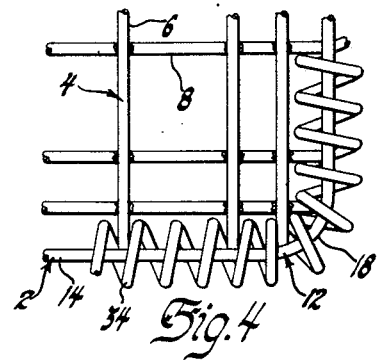
Inventor
Raymond W. Chalmers, deceased
By Elsie M. Chalmers, Administratrix
Willits, Helwig & Baillio
Attorneys

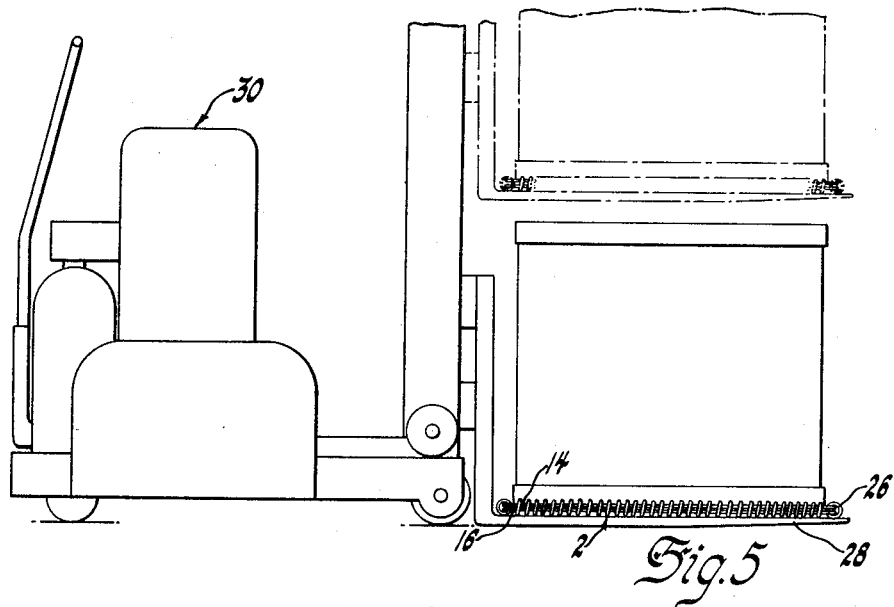
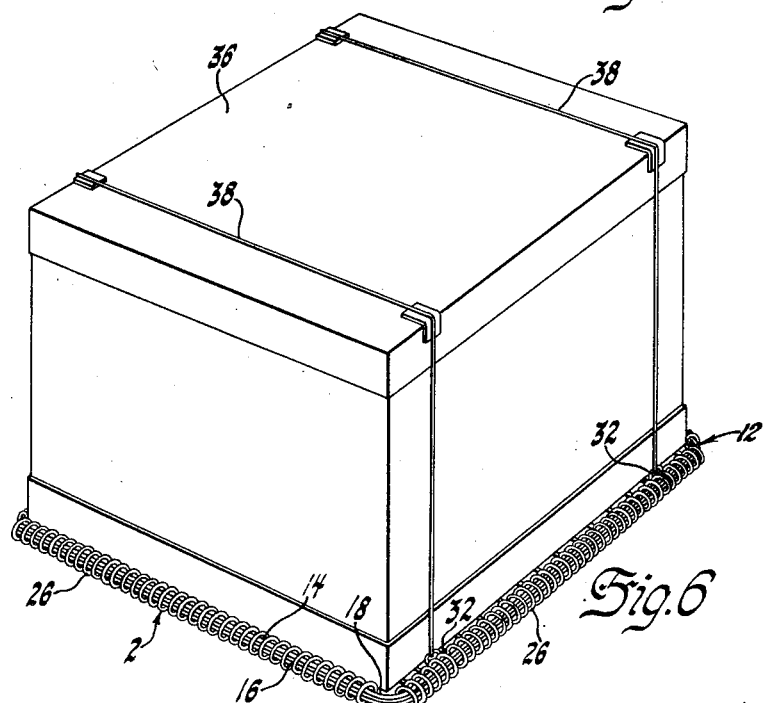

United States Patent Office 2,778,591
Patented Jan. 22, 1957

2,778,591

WIRE PALLET

Raymond W. Chalmers, deceased, late of Detroit, Mich., by Elsie M. Chalmers, executrix, Detroit, Mich.

Application January 21, 1953, Serial No. 332,434

5 Claims. (Cl. 248—120)

This invention relates to pallets for handling materials or packaged articles and particularly to pallets having improved construction adapted to facilitate easier loading.

The great bulk of materials, parts and packaged articles are transported in the present day industrial establishment by means of trucks commonly known as fork-lift trucks. Such trucks are usually provided with a horizontally extending pick-up device mounted on a hydraulic or other type hoist which is integral with and operable from the truck. In operation, the truck is manipulated to move the pick-up device into position under the load to be moved. Generally the horizontally extending portion of the pick-up device comprises one or more blades or forks. The blades or forks usually have knife-like tapered leading edges which are easily inserted beneath a load having little or no clearance from the floor. After the forks are positioned beneath the load, the hoist is operated to raise the load sufficiently to clear floor obstructions and permit movement of the truck from one point to another within the plant. To utilize the fork-lift truck in transporting irregularly shaped articles or a plurality of small articles, it has been customary to load the materials or packaged articles on platforms or pallets which are constructed of various materials.

In the prior art various modes of construction have been employed in fabricating pallets which facilitate moving of the fork member into position therebeneath. Such constructions include the use of legs or bars to support the platform or shelf of the pallet slightly above the floor and thereby provide clearance space for the forks between the floor and the pallet.

It is the object of this invention to provide a material pallet of greatly reduced depth requirements which is adapted to facilitate easy insertion of fork-lift blades from any direction.

A further object is to provide a light weight pallet of maximum strength and minimum cost which may be shipped with the articles carried thereon.

These and other objects and advantages of the invention will become more fully apparent as reference is had to the accompanying drawings wherein:

Fig. 1 is a plan view of one embodiment of the invention.

Fig. 2 is an enlarged fragmentary sectional view taken substantially along the line 2—2 of Fig. 1.

Fig. 3 is an enlarged fragmentary sectional view taken substantially along the line 3—3 of Fig. 1.

Fig. 4 is an enlarged fragmentary view showing a modified form of construction.

Fig. 5 is an elevational view showing a fork-lift truck having a loaded pallet mounted thereon.

Fig. 6 is an isometric view of the pallet construction showing the disposition of a packaged or crated load secured thereon.

Referring now to the drawings and particularly Fig. 1, there is shown a pallet 2 having a load supporting portion 4 formed of spaced apart parallel rods 6 of substantially equal length and spaced apart parallel rods 8 of substantially equal length. Rods 6 and 8, respectively, may be of any suitable length, depending upon the size of the pallet required. To fabricate the load supporting portion 4, rods 6 and 8 are disposed in a suitable fixture, not shown, which is adapted to space and align each of the individual rods in the square pattern shown in Fig. 1. Subsequently, the said rods are spot welded or otherwise secured together at a suitable number of points. After the load supporting portion 4 is formed, a generally rectangular rim portion 12 is disposed about the perimeter of the load supporting portion. Rim member 12 comprises two identical vertically spaced apart rectangular wire members 14 and 16. Rectangular members 14 and 16 preferably are provided with rounded corners 18 and 20 and may be fabricated by bending suitable lengths of wire around a properly dimensioned form and thereafter welding the abutting ends together. Rectangular member 14 is disposed over the upper edge surface of load supporting portion 4 and rectangular member 16 is disposed under the lower edge surface of the said supporting portion. Rectangle members 14 and 16 are of equal size and are intended to register vertically when assembled. It will be seen, therefore, that the terminal portions 22 of rods 6 and 8 are clamped or sandwiched between the straight portions of rectangular members 14 and 16. After the rectangular members have been disposed in the manner described, the load supporting portion and the rectangular members are secured together by individual spot welds at the junctures thereof. Since each rod 8 is slightly offset vertically with reference to each rod 6, rods 6 and 8 are provided with slightly bent-down end portions 24 (Figs. 2 and 3) whereby all the terminal portions 22 lie in a single plane and may be secured to the rim portion 12 without inducing distortion.

In accordance with the present invention, as shown particularly in Fig. 1, individual helical springs 26 of suitable length encircle each of the straight portions of the rim 12. As shown particularly in Figs. 2 and 3, each helical spring 26 is of sufficient diameter to encircle both the upper and lower rectangular members 14 and 16 which comprise the rim 12. Springs 26 may be assembled on rectangular members 14 and 16 either before or after the rectangular members are secured to the load bearing portion. Since rectangular members 14 and 16 are initially formed of a single length of wire which is bent to shape and butt welded to provide an endless rectangular loop, it will be apparent that each spring 26 may be placed in position prior to closing the loop. If it is desired to complete the fabrication of the pallet before assembling the springs 26 in position, the springs may be threaded or wound along the rim portions by rotating the spring in the proper direction. Because the welding process employed in fabricating the pallet may draw the temper of the springs, it will be apparent that the latter method is preferable if it is desired to retain the temper of the springs. In one embodiment of the invention each of the straight edge portions of the rim is provided with continuous lengths of helical spring terminating adjacent the rounded corners 18 and 20 of the rim.

As shown best in Figs. 2 and 3, it will be seen that by encircling each edge of the rim 12 with a helical spring member the main body 4 of the pallet will be supported very slightly above the floor level upon which it is resting. Since the helical springs provide a curved upper approach, the blades 28 of the fork-lift truck 30 will readily slide into position under the pallet. Further, the helical springs are relatively rotatable about the longitudinal axis of each edge of the rim and function as anti-friction rollers when the blades 28 pass thereunder, thereby decreasing frictional resistance incident to loading the pallet. In order to limit the rotation of springs 26 in either direction and prevent accidental or intentional removal by continuous rotation of the springs in one direction, there are provided a plurality of C-shaped links 32 which are clipped at spaced intervals to at least two turns of the helical springs. Links 32 are adapted to grip the adjacent coils of springs 26 sufficiently so as to normally rotate therewith. Hence, springs 26 and links 32 are free to rotate in either direction until the link moves to a position impinging on one of the parallel rods forming the base. Thereafter, further rotation of springs 26 tends to cause the links 32 to twist until the adjacent coils are compressed closely together. With two adjacent coils crowded closely together, a normal threading action of springs 36 along members 14 and 16 is resisted. In this manner free rotation of the springs is restricted to but a few turns in either direction. Although additional rotation of the springs may take place at the points of frictional engagement between the springs and the fork-lift blades, the additional rotation resulting from such frictional engagement will cause the springs to wind up during loading and to unwind when the pallet is unloaded.

In Fig. 4 there is shown a modification of the invention wherein a helical spring 34 is formed from a single length of spring material. Spring 34 extends completely around the rim 12 and surrounds both the straight portions and curved corners. This construction substantially reduces the time consumed in assembling the spring member about the perimeter of the pallet, as well as eliminating the necessity of cutting four individual lengths of springs.

In Fig. 5 the pallet 2 is shown disposed in loaded position over the blades 28 of the fork-lift truck 30. After the truck has been moved into the position illustrated, the lifter mechanism is raised to the position shown in dotted lines to facilitate movement from one point to another.

In Fig. 6 there is illustrated a crated load 36 mounted on the pallet 2. For loads of this type the pallet may be semi-permanently secured to the crates by wires 38. Since crates are often handled numerous times in the course of shipment, it will be apparent that a pallet of this type will be especially attractive in instances where it is necessary to move loads considerable distances. Because of the small space requirements of this type of pallet, large numbers of empty pallets may be stacked in a small space and returned to the originating point at low cost.

From the foregoing it will be seen that there has been provided a pallet with greatly improved loading characteristics. In addition the device is susceptible to extremely simple fabricating techniques and may be constructed in a wide range of sizes at extremely low cost. Because of its compactness and low cost it is practicable to secure packaged articles on this type of pallet and utilize it for long range transportation as well as for temporary movement of materials within a plant.

While two forms of the invention have been shown and described, it will be apparent that various changes and modifications may be made therein without departing from the scope of the invention. It is therefore to be understood that it is not intended to limit the invention to modifications shown herein.

I claim:

1. A pallet for use with a lifter mechanism having pick-up arms, comprising a relatively flat load supporting portion, a rim portion secured about the perimeter of said load supporting portion, said rim defining four relatively straight portions, and a plurality of helical springs, each of said springs being disposed in surrounding relation to said straight portions whereby said load supporting portion is supported slidably above the surface on which said pallet is disposed, said springs being adapted for limited rotation responsive to slidable movement of said pick-up arms beneath said pallet.

2. In a pallet for use with a lifter mechanism having pick-up arms, a substantially rectangular wire mesh load supporting portion, means bent to form a rim for said load supporting portion, said means comprising a pair of rectangular wire members having curved corners, each of said members being secured respectively above and below the perimeter of said load supporting portion, and spring means surroundingly embracing substantially all of said rim to reduce frictional resistance when said pick-up arms are moved into position under said pallet.

3. A pallet for use with a lifter mechanism having pick-up arms, comprising a relatively flat load supporting portion formed of wire elements disposed in a substantially uniform criss-cross pattern, a rim portion secured about the perimeter of said load supporting portion, a plurality of helical springs, each of said springs being disposed in surrounding relation to said rim portion, said springs being adapted to rotate responsive to slidable movement of said pick-up arms beneath said pallet, and means associated with said springs to limit the free rotation thereof relative to said load supporting portion.

4. A pallet for use with a lifter mechanism having pick-up arms, comprising a load supporting portion formed of spaced apart longitudinal wire members and spaced apart lateral wire members, said lateral wire members immediately over-lying said longitudinal wire members, all of said wire members being provided with bent end portions whereby the perimeter of said load supporting portion occupies a single plane, a rim extending around said perimeter, said rim comprising a pair of rectangular wire members secured respectively above and below the said perimeter, and spring means surroundingly embracing said rim and adapted for limited rotation therearound during loading or unloading of said pallet.

5. A pallet comprising groups of spaced rods, the rods of one group being disposed at substantially right angles to another group, said groups forming a flat substantially rectangular load supporting portion, each end of the rods of one group being bent downwardly whereby the terminal ends of the rods of both groups lie in a single plane, a rim secured to said terminal ends and extending around the perimeter of said load supporting portion, and helical means disposed about a substantial portion of said rim.

References Cited in the file of this patent

UNITED STATES PATENTS

| 2,432,182 | Turner | Dec. 9, 1947 |
| 2,576,671 | Coit | Nov. 27, 1951 |
| 2,590,941 | Coit | Apr. 1, 1952 |
| 2,634,932 | Withers | Apr. 14, 1953 |

FOREIGN PATENTS

| 120,887 | Australia | Jan. 18, 1946 |